(12) United States Patent
Klemer et al.

(10) Patent No.: US 7,570,411 B2
(45) Date of Patent: Aug. 4, 2009

(54) OPTICAL LIMITER HAVING TRIMETALLIC NITRIDE ENDOHEDRAL METALLOFULLERENCE FILMS

(75) Inventors: Daniel R. Klemer, Lexington, VA (US); Charles B. Gause, Providence, NC (US); Steven A. Stevenson, Hattiesburg, MS (US)

(73) Assignee: Luna Innovations Incorporated, Roanoke, VA (US)

( * ) Notice: Subject to any disclaimer, the term of this patent is extended or adjusted under 35 U.S.C. 154(b) by 107 days.

(21) Appl. No.: 10/594,029

(22) PCT Filed: Mar. 25, 2005

(86) PCT No.: PCT/US2005/010216

§ 371 (c)(1),
(2), (4) Date: Jul. 23, 2007

(87) PCT Pub. No.: WO2005/096726

PCT Pub. Date: Oct. 20, 2005

(65) Prior Publication Data

US 2007/0285787 A1    Dec. 13, 2007

Related U.S. Application Data

(60) Provisional application No. 60/556,429, filed on Mar. 26, 2004.

(51) Int. Cl.
G02F 1/03 (2006.01)
A61B 5/055 (2006.01)
C07F 5/00 (2006.01)

(52) U.S. Cl. .................. 359/241; 359/244; 359/452; 424/9.3; 424/9.36; 424/9.4; 424/9.1; 424/1.11; 534/11; 534/15; 423/263; 438/778; 438/780

(58) Field of Classification Search .............. 359/227, 359/241, 244, 253, 265, 296, 298, 299, 452, 359/885; 423/263, 364, 414, 461, 447.3, 423/9.36; 534/11, 15; 424/1.1, 1.65, 9.1; 422/186, 186.21; 438/157, 466, 587, 780; 428/212, 408; 502/416; 427/7, 256; 345/85, 345/105–108, 111
See application file for complete search history.

(56) References Cited

U.S. PATENT DOCUMENTS 5,172,278 A    12/1992    Tutt (Continued)

OTHER PUBLICATIONS

Iezzi, Erick B. et al., "A Symmetric Derivative of the Trimetallic Nitride Endohedral Metallofullerene, $Sc_3N@C_{80}$," J.Am.Chem. Soc., 2002, pp. 524-525, vol. 124, No. 4, American Chemical Society.

(Continued)

*Primary Examiner*—Loha Ben
(74) *Attorney, Agent, or Firm*—Buchanan Ingersoll & Rooney PC

(57) ABSTRACT

An exemplary optical limiter device (100) has an optically transmissive substrate (102) and a layer (104) on a first surface (106) of the substrate, the layer having a trimetallic nitride endohedral metallofullerene. The layer can be a thin film of the trimetallic nitride endohedral metallofullerene, a layer material with a cavity containing a solution with the trimetallic nitride endohedral metallofullerene, a sol-gel with a trimetallic nitride endohedral metallofullerene, and a self assembled monolayer with a trimetallic nitride endohedral metallofullerene. The layers of trimetallic nitride endohedral metallofullerenes can be vapor deposited, solution deposited and/or self assembled onto optical components. The third-order nonlinear properties of these films provide desired transmission characteristics.

32 Claims, 3 Drawing Sheets

U.S. PATENT DOCUMENTS

| | | | |
|---|---|---|---|
| 5,269,953 | A | 12/1993 | Whewell |
| 5,453,413 | A | 9/1995 | Eklund |
| 5,717,076 | A * | 2/1998 | Yamamoto et al. .......... 534/558 |
| 5,805,326 | A | 9/1998 | Snow et al. |
| 6,063,243 | A | 5/2000 | Zettl et al. |
| 6,174,780 | B1 | 1/2001 | Robinson |
| 6,303,760 | B1 | 10/2001 | Dorn et al. |
| 6,471,942 | B1 | 10/2002 | Miller et al. |
| 6,522,447 | B2 * | 2/2003 | Wang et al. ................. 359/241 |
| 6,815,067 | B2 | 11/2004 | Ata et al. |
| 7,060,636 | B2 * | 6/2006 | Phillips et al. .............. 438/780 |
| 7,358,343 | B2 * | 4/2008 | Dorn et al. .................... 534/15 |
| 2001/0050219 | A1 | 12/2001 | Anazawa et al. |
| 2002/0061638 | A1 | 5/2002 | Takikawa et al. |
| 2002/0182388 | A1 | 12/2002 | Wang et al. |
| 2002/0189666 | A1 | 12/2002 | Forest et al. |
| 2003/0015414 | A1 | 1/2003 | Kajiura et al. |
| 2004/0054151 | A1 | 3/2004 | Dorn et al. |
| 2006/0088474 | A1 * | 4/2006 | Dorn et al. ................. 424/9.36 |

OTHER PUBLICATIONS

Kratschmer, W. et al., "Solid $C_{60}$: a new form of carbon," Nature, Sep. 27, 1990, pp. 354-358, vol. 347, Nature Publishing Group.

Olmstead, Marilyn M. et al., "Isolation and Crystallographic Characterization of $ErSc_2N@C_{80}$: an Endohedral Fullerene Which Crystallizes with Remarkable Internal Order," J.SM.VHRM.SOC., 2000, pp. 12220-12226, vol. 122, No. 49, AmericanChemical Society.

Stone, A.J. et al., "Theoretical Studies of Icosahedral $C_{60}$ and Some Related Species," Chem. Physics Ltrs., Aug. 8, 1986, pp. 501-503, vol. 128, No. 5,6, Elsevier Science Publishers B.V.

Trulove, "Filed buckyballs—diamonds from soot," article from website http://www.research.vt.edu/resmag/2002winter/buckyballs.html, Mar. 9, 2002 (Mar. 9, 2002), available at www.archive.org (entire document).

Nagase et al., Chapter 9: Endohedral metallofullerenes: theory, electrochemistry, and chemical reactions, of Fullerenes: Chemistry, Physics and Technology (Kadish and Ruoff, eds.), 2000, John Wiley and Sons, pp. 395-429.

Wilson et al., "Advanced materials: fluorous fullerenes and nanotubes," *Tetrahedron,* 2002, vol. 58, pp. 4041-4047, Elsevier Science Ltd.

Soon et al., "One-dimensional photonic crystal optical limiter", Optics Express, 2003, vol. 11, No. 17, pp. 2007-2018.

* cited by examiner

OPTICAL LIMITER HAVING TRIMETALLIC NITRIDE ENDOHEDRAL METALLOFULLERENCE FILMS

TECHNICAL FIELD

This disclosure is related to optical thin films, and nonlinear optics. More specifically, this disclosure is related to fullerene-based optical limiter devices.

BACKGROUND

In the discussion of the state of the art that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

Optical sensors are important, light sensitive devices that are used in light detection. They can, however, be damaged if they are exposed to a high enough intensity of light. Optical limiters allow transmission of light at a low intensity and allow limited transmission of light at higher intensities. Maintaining transmitted light below a certain threshold value contributes to protection of light sensitive elements such as optical sensors and the human eye.

Active and passive forms of optical sensor protection are known. One form of sensor protection may include, for example, special glasses that a welder uses to protect the welder's eyes from the high intensity light generated by the welder's arc. Active optical limiters may include an optical sensor that can sense high intensity light and communicate electronically to an actuator to block at least some of the light, thereby reducing its intensity and minimizing damage to the sensor. Passive optical limiters are based on a wide variety of nonlinear optical phenomena, such as reverse saturable absorption, two-photon absorption, thermal lensing effects, optically-induced molecular reorientation in liquid crystals.

Optical limiting devices placed between the light source and the sensor can provide the sensor with protection from high intensity light. These protective devices absorb or scatter high intensity light while transmitting low intensity light from the light source to the sensor. No communication from the sensor or from any other device occurs in a passive optical limiting device for the device to regulate transmitted light. The increased speed is particularly important for applications where the sensor may be exposed to sudden bursts of high intensity light. Optical limiting devices are used, for example, to protect optical sensors in pulsed laser systems.

There are a variety of other materials that have been used as optical limiters, including various chemical compounds and even empty-cage fullerenes, e.g., classic fullerene structures where the interior space is empty. Some devices employ an active system that senses light intensity and controls a variable attenuator to limit the transmission through the device. A review of optical limiting devices may be found in Lee W. Tuft, et. al., "A Review of Optical Limiting Mechanisms and Devices Using Organics, Fullerenes, Semiconductors, and Other Materials," Prog. Quant. Electr, 1993, vol. 17, pp. 299-338, the contents of which are herein incorporated by reference.

There are four main performance criteria for which prior materials for optical limiters fall short. First, these materials often do not have sufficiently high nonlinearity to limit the transmitted light intensity to below the levels at which the protected optical equipment would be damaged. Second, material response is often slow, making such materials ineffective in blocking very short high-intensity pulses. Third, such materials should, but often do not, recover very rapidly after a limiting event in order to minimize the impact of the event on normal operation of the system. Fourth, the materials ideally would transmit nearly all of the light at low intensity, and therefore would not degrade the normal operation of the system. In practice, these four performance criteria are often not met in a single optical limiter device.

SUMMARY

An optical limiter device comprises an optically transmissive substrate and a layer on a first surface of the substrate, the layer including a trimetallic nitride endohedral metallofullerene.

A method of forming an optical limiter device comprises forming a layer including a trimetallic nitride endohedral metallofullerene on a substrate by a technique selected from the group consisting of a vapor deposition technique, a solution technique and a self-assembled monolayer technique.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION

Figure 1:
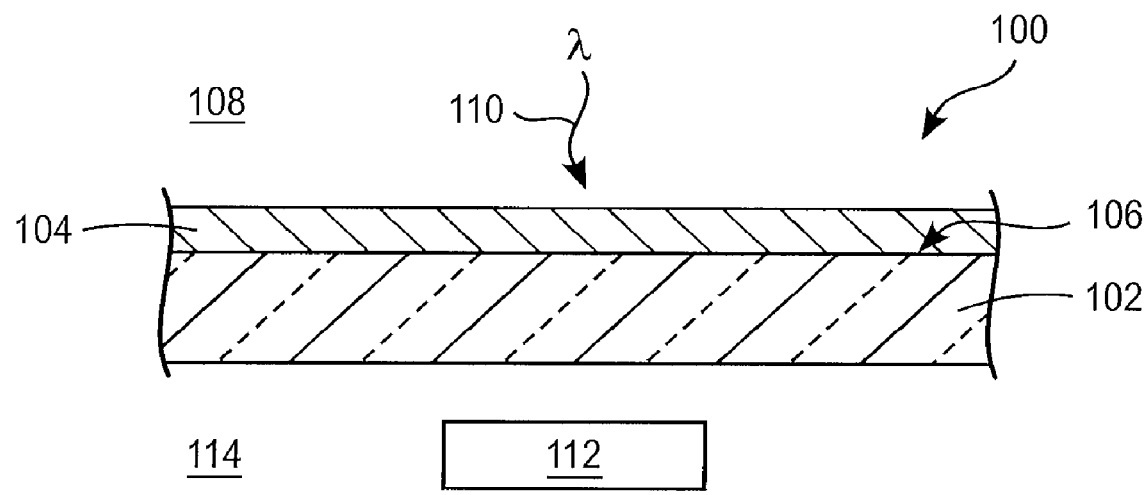
FIG. 1 illustrates an exemplary embodiment of an optical limiter device having a layer including a trimetallic nitride endohedral metallofullerene.

FIG. 1 illustrates an exemplary embodiment of an optical limiter device 100. The exemplary optical limiter device 100 comprises an optically transmissive substrate 102 and a layer 104 on a first surface 106 of the substrate 102. The layer 104 includes a trimetallic nitride endohedral metallofullerene. A first side 108 of the optical limiter device 100 receives incident electromagnetic radiation 110, such as laser light or wavelengths from the infrared, visible or ultraviolet spectra, and a sensor 112 is on a second side 114 of the optical limiter device 100.

The trimetallic nitride endohedral metallofullerenes (also called herein a trimetaspheres) of the exemplary embodiments have the general formula $A_{3-n}X_nN@C_m$, where n ranges from 0 to 3, A and X may be trivalent metal atoms/ions and may be either a rare earth metal or a group IIIB metal, m is between about 60 and about 200, and N is a heteroatom/ion such as nitrogen or phosphorous. The trimetallic nitride endohedral metallofullerenes have in the interior space a metal atom/ion complexed with a heteroatom/ion (differing from a classic metallofullerene, e.g., a fullerene with one or more metal ions in an interior space (such as $Gd^{+3}@C_{60}$)).

The size of the trimetallic nitride endohedral metallofullerene cage increases as the ionic radius for the metal increases. For example, to form a trimetallic nitride endohedral metallofullerene having a cage size at or below about 68, the metal atoms preferably have an ionic radius below about 0.090 nm (0.005 nm). To form a trimetallic nitride endohedral metallofullerene having a cage size between about 68 carbon atoms and about 80 carbon atoms, the metal atoms are preferably trivalent and have an ionic radius below about 0.095 nm ((0.005 nm).

Preferably, the trimetallic nitride endohedral metallofullerenes are selected from the $A_{3-n}X_nN@C_{68}$, $A_{3-n}X_nN@C_{78}$, or $A_{3-n}X_nN@C_{80}$ families of endohedral fullerenes. Element A is selected from the group consisting of a rare earth element and a group IIIB element, preferably selected from the group consisting of Scandium, Yttrium, Lanthanum, Cerium, Praseodymium, Neodymium, Gadolinium, Terbium, Dysprosium, Holmium, Erbium, Thulium, and Ytterbium; and more preferably selected from the group consisting of Erbium, Holmium, Scandium, Terbium and Yttrium, and most preferably Terbium. Preferably, Element X is selected from the group consisting of a rare earth element and a group IIIB element preferably selected from the group consisting of Scandium, Yttrium, Lanthanum, Cerium, Praseodymium, Neodymium, Gadolinium, Terbium, Dysprosium, Holmium, Erbium, Thulium, and Ytterbium, and more preferably is Scandium.

As used herein, "endohedral" refers to the encapsulation of atoms inside the fullerene cage network. Accepted symbols for elements and subscripts to denote numbers of elements are used herein. Further, all elements to the right of an @ symbol are part of the fullerene cage network, while all elements listed to the left are contained within the fullerene cage network. Under this notation, $Sc_3N@C_{80}$ indicates that the $Sc_3N$ trimetallic nitride is situated within a $C_{80}$ fullerene cage.

Preferably, the layer 104 of the optical limiter device 100 shown in the exemplary embodiment of FIG. 1 includes trimetallic nitride endohedral metallofullerenes in the form of thin films including $Er_3N@C_{80}$ or $ErSc_2N@C_{80}$ materials.

The thin films including $Er_3N@C_{80}$ or $ErSc_2N@C_{80}$ materials, or including any other trimetallic nitride endohedral metallofullerene materials, can be deposited on the surface of the optically transmissive substrate by a vapor deposition technique. For example, powders from forming carbonaceous materials in a reactor process can be recovered and purified to obtain trimetallic nitride endohedral metallofullerene. An example of this process is disclosed in U.S. Pat. No. 6,303,760, the entire disclosure of which is herein incorporated by reference. The recovered and purified trimetallic nitride endohedral metallofullerene are subsequently used to form thin films by any suitable technique. Suitable techniques included physical vapor deposition, chemical vapor deposition, laser assisted deposition, molecular beam evaporation, evaporation from solution, electrochemical deposition and electrophoretic deposition. A vapor deposition technique is preferred. In physical vapor deposition, for example, trimetallic nitride endohedral metallofullerene gases and/or targets are used in a conventional reactor to produce the desired trimetallic nitride endohedral metallofullerenes vapor deposited layers on a substrate.

In exemplary embodiments, the layer 104 including trimetallic nitride endohedral metallofullerenes has a thickness of a monolayer of trimetallic nitride endohedral metallofullerenes to 1 mm, preferably from about 1 nm to about 1 micron. The thickness can vary based upon design requirements. For example, thicker films would be used in applications that can tolerate lower transmission at low intensity levels but that require more limited transmission at maximum intensity.

In another embodiment, the trimetallic nitride endohedral metallofullerene materials may be used in solution to provide optical limiting behavior. For example, an embodiment of an optical limiter can include a layer having a cavity that contains a solution including a trimetallic nitride endohedral metallofullerenes.

Figure 2:
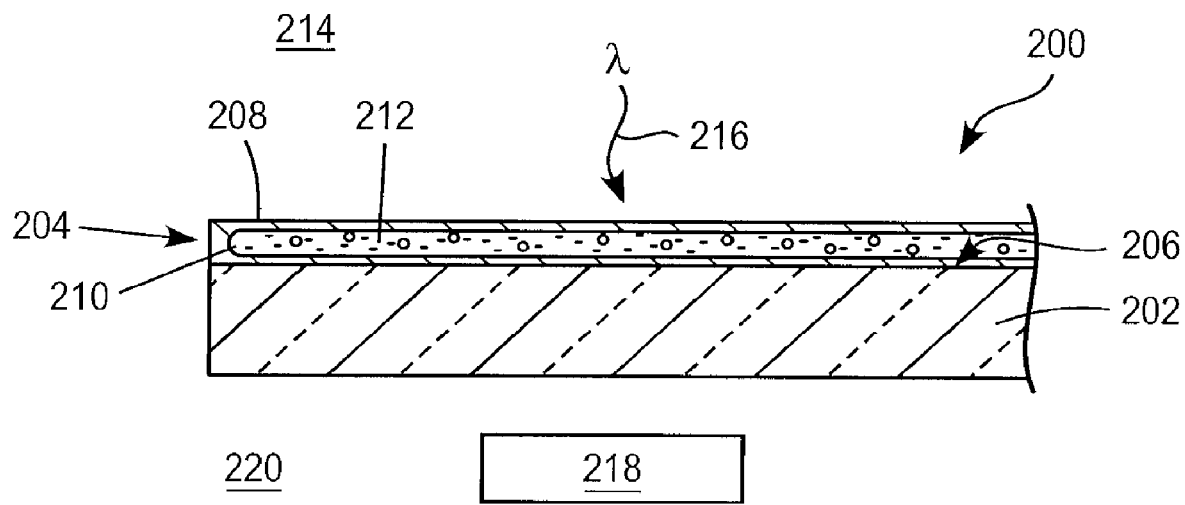
FIG. 2 illustrates another exemplary embodiment of an optical limiter device having a layer including a trimetallic nitride endohedral metallofullerene.

FIG. 2 shows an exemplary embodiment of an optical limiter 200 comprising an optically transmissive substrate 202 and a layer 204 on a first surface 206 of the substrate 202. The layer 204 includes a layer material 208 with a cavity 210 that contains a solution 212 including a trimetallic nitride endohedral metallofullerene. For example, the layer material can be an optically transmissive material (which may be the same material or a different material from the optically transmissive substrate) and the solution in the cavity can be a trimetallic nitride endohedral metallofullerene dissolved, dispersed or suspended in a solvent such as toluene. A first side 214 of the optical limiter device 200 receives incident electromagnetic radiation 216, such as laser light or wavelengths from the infrared, visible or ultraviolet spectra, and a sensor 218 is on a second side 220 of the optical limiter device 200.

Figure 3:
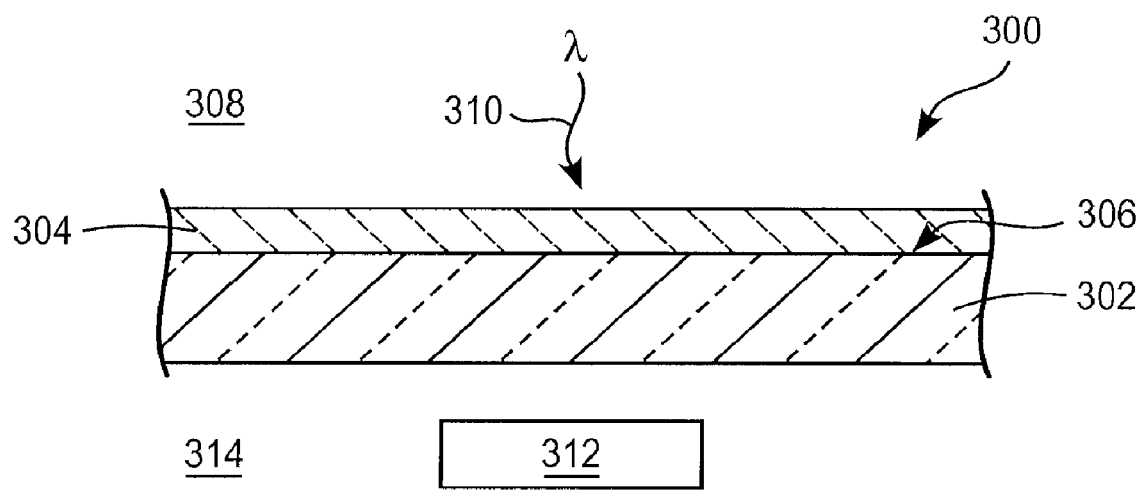
FIG. 3 illustrates a further exemplary embodiment of an optical limiter device having a layer including a trimetallic nitride endohedral metallofullerene.

Another embodiment of an optical limiter device can include a layer of a sol-gel on the first surface of a substrate. For example and as shown in FIG. 3, an exemplary optical limiter device 300 comprises an optically transmissive substrate 302 and a layer 304 on a first surface 306 of the substrate 302. The layer 304 includes a sol-gel containing a trimetallic nitride endohedral metallofullerene. A first side 308 of the optical limiter device 300 receives incident electromagnetic radiation 310, such as laser light or wavelengths from the infrared, visible or ultraviolet spectra, and a sensor 312 is on a second side 314 of the optical limiter device 300. An exemplary sol-gel includes a polar-solvent-based sol-gel with a trimetallic nitride endohedral metallofullerene suspended therein.

Figure 4:
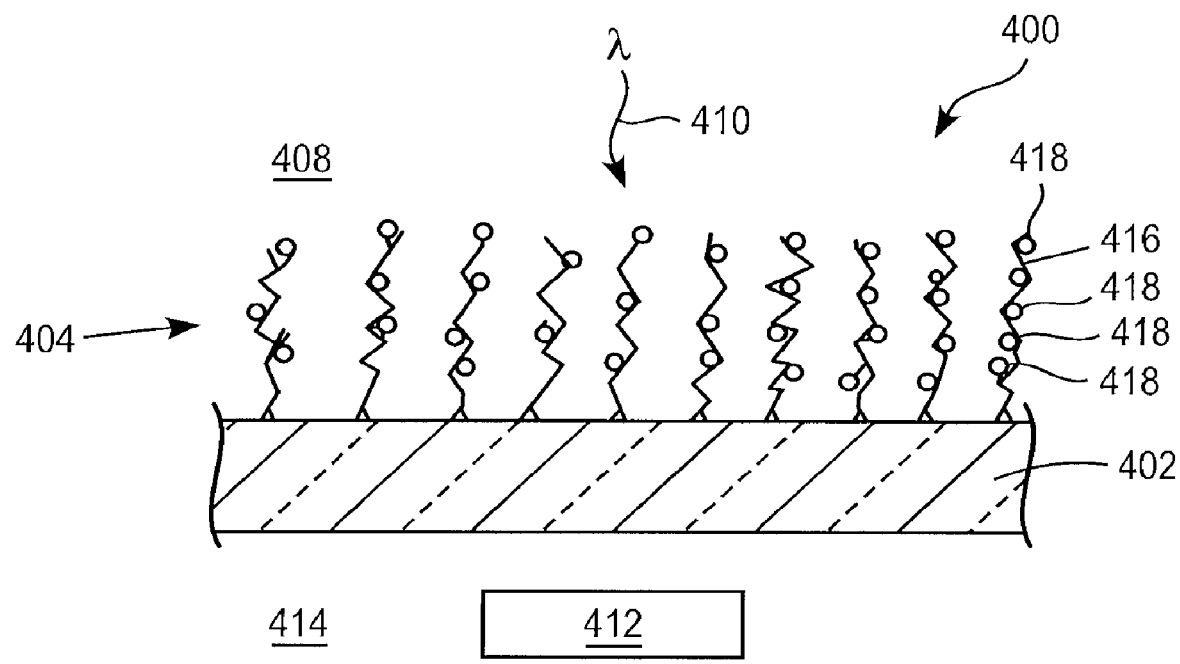
FIG. 4 illustrates still another exemplary embodiment of an optical limiter device having a layer including a trimetallic nitride endohedral metallofullerene.

FIG. 4 illustrates an exemplary optical limiter device 400 comprising an optically transmissive substrate 402 and a layer 404 on a first surface 406 of the substrate 402. The layer 404 includes one or more self assembled monolayers containing a trimetallic nitride endohedral metallofullerene. A first side 408 of the optical limiter device 400 receives incident electromagnetic radiation 410, such as laser light or wavelengths from the infrared, visible or ultraviolet spectra, and a sensor 412 is on a second side 414 of the optical limiter device 400. An exemplary molecule for use in the self-assembled monolayer is a hydrolized molecule 416. However, any method to allow for improved solubility in aqueous or non-aqueous solvents can be used. For example, improved hydophillicity can be achieved by the use of ligands such as isochromine, dendrimers, hydroxyl groups, carboxyl groups, sulfonates, and so forth and the trimetallic nitride endohedral metallofullerene can be selectively hydroxylated, hydrosulfanated, and so forth. The molecule may also be optionally functionalized to preferentially bind to the trimetallic nitride endohedral metallofullerene 418 and/or to the first surface of the substrate.

Lithographic techniques, masks and other patterning techniques can be employed to produce patterned depositions and/or layers having mixed transmissive materials and properties. Any of the embodiments of an optical limiter disclosed herein can also have a patterned layer including a trimetallic nitride endohedral metallofullerene, e.g., the thin film layer, the solution-based layer and/or the sol-gel layer.

Figure 5:
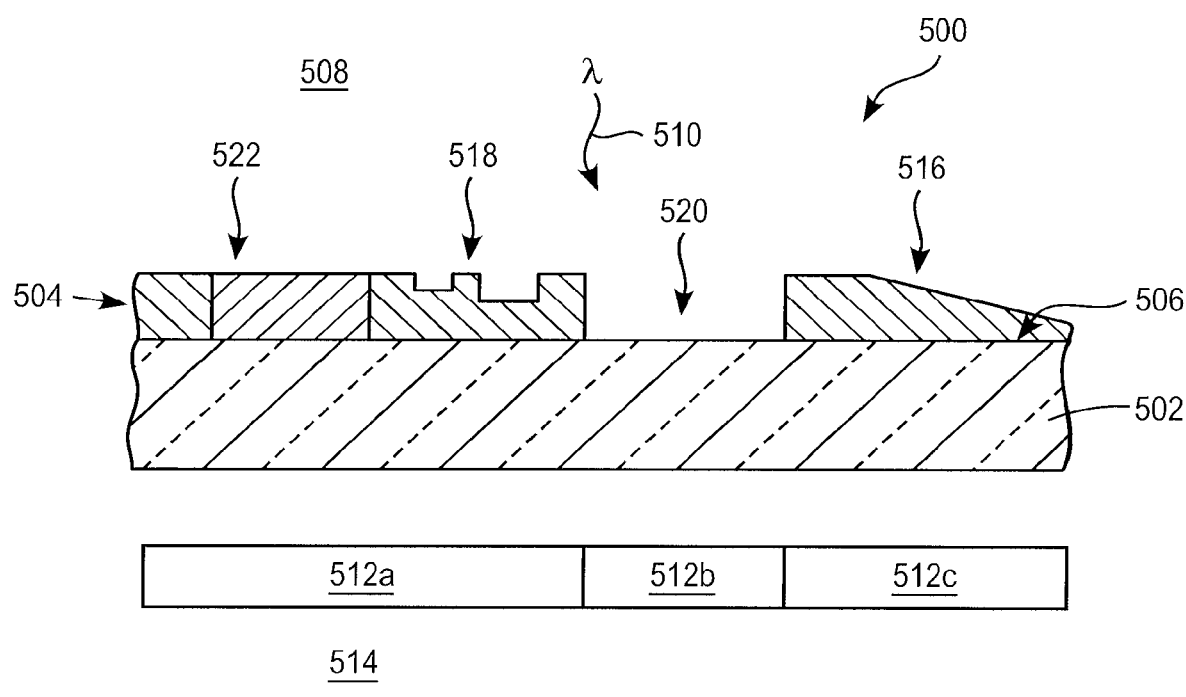
FIG. 5 illustrates an exemplary embodiment of an optical limiter device having a patterned layer including a trimetallic nitride endohedral metallofullerene.

FIG. 5 illustrates an exemplary optical limiter device 500 comprising an optically transmissive substrate 502 and a patterned layer 504 on a first surface 506 of the substrate 502. The patterned layer 504 includes a trimetallic nitride endohedral metallofullerene. A first side 508 of the optical limiter device 500 receives incident electromagnetic radiation 510, such as laser light or wavelengths from the infrared, visible or ultraviolet spectra, and a sensor or a plurality of sensors 512a, 512b, 512c is on a second side 514 of the optical limiter device 500.

Exemplary patterned layers include one or more portions having a variation in thickness or material composition across at least a portion of the area of the first surface. Examples of patterned layers can include one or more of the following: an area 516 with a gradually changing thickness; one or more areas 518 with a step change thickness or trench, such as that formed in semiconductor processing; an area 520 without a layer including a trimetallic nitride endohedral metallofullerene; and/or an area 522 with a mixed material composition, for example a sub-area 524 including a trimetallic nitride endohedral metallofullerene and a second sub-area including a filter, coating, or metallic reflector.

The pattern of the patterned layer can be any suitable pattern. Furthermore, the pattern may be selected to match a function of a sensor placed on the second side of the optical limiter device.

The substrate may be any suitable optically transmissive substrate. Accordingly, as used herein, an optically transmissive substrate is any substrate that permits transmission through the substrate of a desired wavelength of electromagnetic radiation. Examples of suitable substrates include glasses, including quartz and chalcogenide materials, ceramics, such as $Al_2O_3$, and semiconductors, such as silicon and GaAs. A preferred example of a substrate is glass or $Al_2O_3$ (sapphire).

Devices made using trimetallic nitride endohedral metallofullerenes can have application in satellite-based and terrestrial-based optical communications systems, fiber optic transmission systems, and laser safety windows and eyewear. For example, optical features of such systems may have a coating or layer including trimetallic nitride endohedral metallofullerenes which provides the desired performance criteria, including non-linearity, response time, recovery time, and low intensity transmission.

Further details concerning trimetallic nitride endohedral metallofullerenes, their material characteristics and their uses may be found in U.S. Pat. No. 6,303,760, the entire disclosure of which is herein incorporated by reference.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An optical limiter device comprising: an optically transmissive substrate; and a layer on a first surface of the substrate, the layer including a trimetallic nitride endohedral metallofullerene.

2. The optical limiter device of claim 1, wherein the layer includes one or more of: a thin film including the trimetallic nitride endohedral metallofullerene, a layer material with a cavity containing a solution including the trimetallic nitride endohedral metallofullerene, a sol-gel containing a trimetallic nitride endohedral metallofullerene, and a self assembled monolayer containing a trimetallic nitride endohedral metallofullerene.

3. The optical limiter device of claim 2, wherein the layer comprises a thin film consisting essentially of the trimetallic nitride endohedral metallofullerene.

4. The optical limiter device of claim 1, wherein the trimetallic nitride endohedral metallofullerene has a general formula $A_{3-n}X_nN@C_m$, wherein n ranges from 0 to 3, A and X are a trivalent metal, m is between about 60 and about 200, and N is a heteroatom/ion.

5. The optical limiter device of claim 4, wherein N is nitrogen.

6. The optical limiter device of claim 4, wherein the trivalent metal is a rare earth metal or a group IIIB metal.

7. The optical limiter device of claim 6, wherein A is selected from the group consisting of Scandium, Yttrium, Lanthanum, Gadolinium, Holmium, Terbium, Erbium, Thulium, and Ytterbium.

8. The optical limiter device of claim 7, wherein A is selected from the group consisting of Terbium, Erbium, Holmium, Scandium and Yttrium.

9. The optical limiter device of claim 6, wherein X is selected from the group consisting of Scandium, Yttrium, Lanthanum, Gadolinium, Holmium, Terbium, Erbium, Thulium, and Ytterbium.

10. The optical limiter device of claim 1, wherein the substrate is a glass.

11. The optical limiter device of claim 10, wherein the substrate is quartz or a chalcogenide glass.

12. The optical limiter device of claim 1, wherein the layer has a thickness of one monolayer of the trimetallic nitride endohedral metallofullerene to 1 mm.

13. The optical limiter device of claim 12, wherein the thickness is from about 1 nm to 1 micron.

14. The optical limiter device of claim 1, wherein the layer is a patterned layer.

15. A method of forming an optical limiter device, the method comprising; forming a layer including a trimetallic nitride endohedral metallofullerene on an optically transmissive substrate by a technique selected from the group consisting of a vapor deposition technique, a solution technique and a self-assembled monolayer technique.

16. The method of claim 15, wherein the selected technique is a vapor deposition technique including physical vapor deposition, chemical vapor deposition, laser assisted deposition, molecular beam evaporation.

17. The method of claim 15, wherein the selected technique is a solution technique including evaporation from solution, electrochemical deposition, electrophoretic deposition.

18. The method of claim 15, wherein the selected technique is a solution technique including encapsulating a solution containing the trimetallic nitride endohedral metallofullerene in a cavity in the layer.

19. The method of claim 15, wherein the selected technique is a self-assembled monolayer technique including forming a layer of a functionalized molecule on the substrate, the functionalized molecule modified for improved solubility in an aqueous or non-aqueous solvent.

20. The method of claim 19, wherein the functionalized molecule preferentially binds to the trimetallic nitride endohedral metallofullerene and/or to a first surface of the substrate.

21. The method of claim 15, wherein the trimetallic nitride endohedral metallofullerene has a general formula $A_{3-n}X_nN@C_m$, wherein n ranges from 0 to 3, A and X are a trivalent metal, m is between about 60 and about 200, and N is a heteroatom/ion.

22. The method of claim 21, wherein N is nitrogen.

23. The method of claim 21, wherein the trivalent metal is a rare earth metal or a group IIIB metal.

24. The method of claim 23, wherein A is selected from the group consisting of Scandium, Yttrium, Lanthanum, Gadolinium, Holmium, Terbium, Erbium, Thulium, and Ytterbium.

25. The method of claim 24, wherein A is selected from the group consisting of Terbium, Erbium, Holmium, Scandium and Yttrium.

26. The method of claim 23, wherein X is selected from the group consisting of Scandium, Yttrium, Lanthanum, Gadolinium, Holmium, Terbium, Erbium, Thulium, and Ytterbium.

27. The method of claim 15, wherein the substrate is a glass.

28. The method of claim 27, wherein the substrate is quartz or a chalcogenide glass.

29. The method of claim 15, wherein the layer is deposited to a thickness of one monolayer of the trimetallic nitride endohedral metallofullerene to 1 mm.

30. The method of claim 29, wherein the thickness is from about 1 nm to 1 micron.

31. The method of claim 15, comprising patterning the layer.

32. The method of claim 31, wherein patterning includes masking or photolithography.

* * * * *